Figure 1:
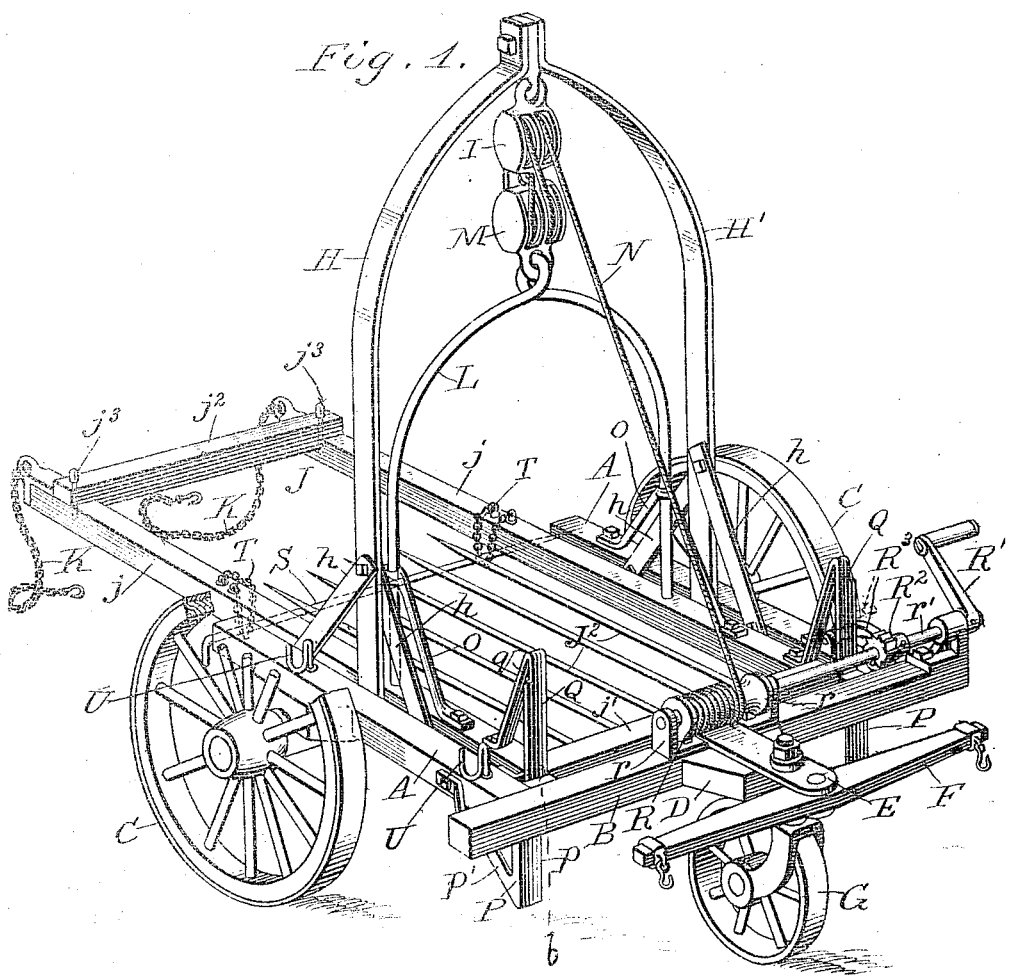

G. MARSHALL.
SHOCK TRUCK.
APPLICATION FILED APR. 3, 1911.

998,707.

Patented July 25, 1911.

2 SHEETS—SHEET 1.

Witnesses

Inventor
George Marshall
By Baldwin Whyte
his Attorney

G. MARSHALL.
SHOCK TRUCK.
APPLICATION FILED APR. 3, 1911.
998,707.
Patented July 25, 1911.
2 SHEETS—SHEET 2.
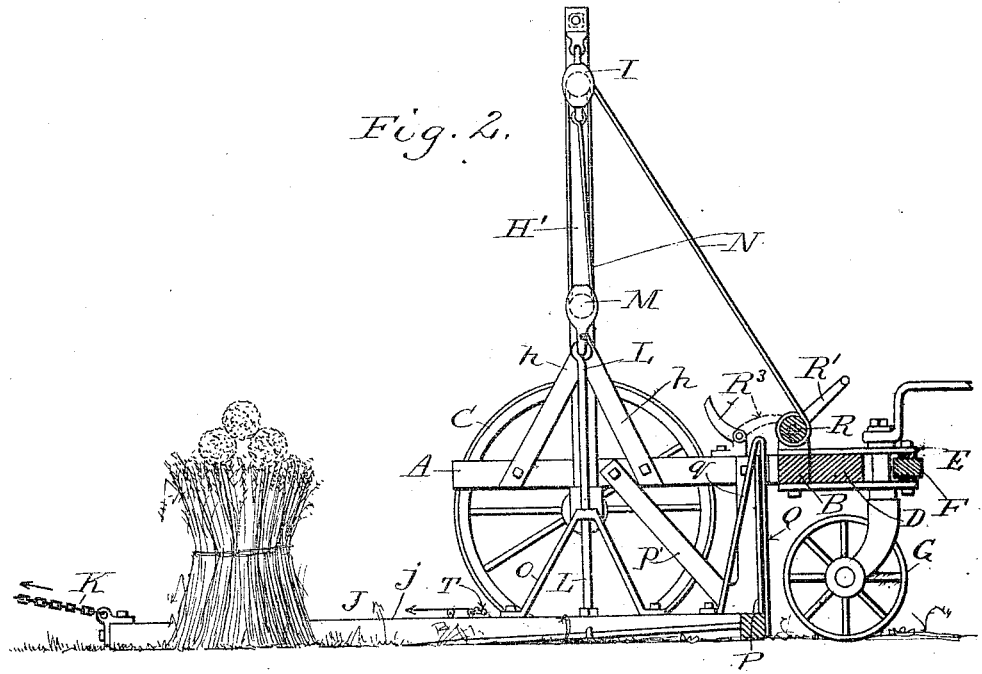
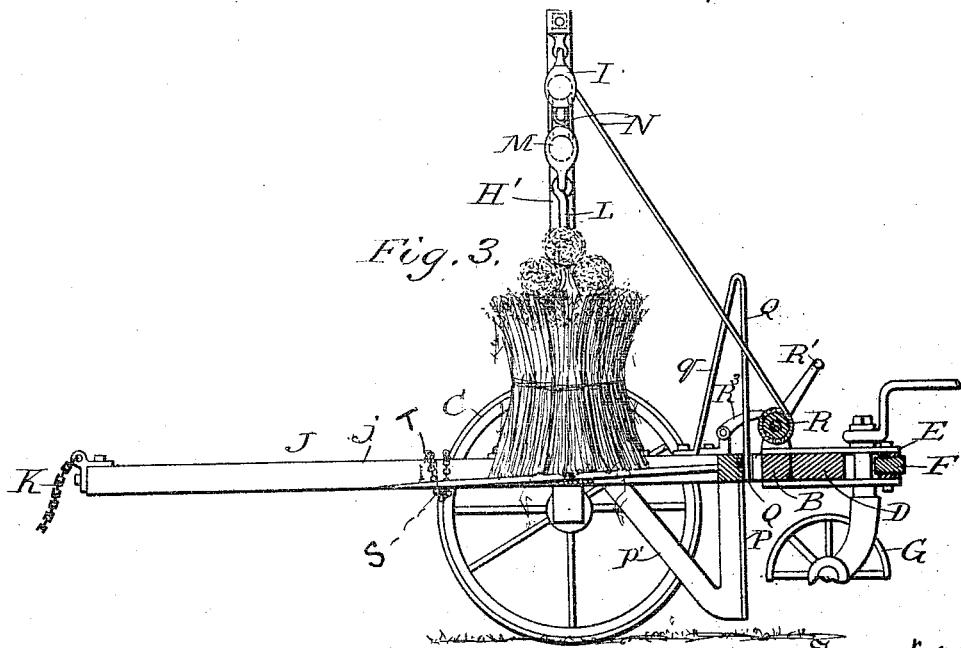
Witnesses
Inventor
George Marshall

UNITED STATES PATENT OFFICE.

GEORGE MARSHALL, OF FREMONT, NEBRASKA.

SHOCK-TRUCK.

998,707.

Specification of Letters Patent. Patented July 25, 1911.

Application filed April 3, 1911. Serial No. 618,624.

*To all whom it may concern:*

Be it known that I, GEORGE MARSHALL, a citizen of the United States, residing at Fremont, in the county of Dodge and State of Nebraska, have invented certain new and useful Improvements in Shock-Trucks, of which the following is a specification.

In my United States Patent No. 937,454 of October 19, 1909, I have shown a machine which receives sheaves from a binder, forms them into shocks and deposits them in the field.

The object of my present invention is to provide a truck for conveying the shocks from places where they are deposited to plowed strips of ground or elsewhere.

In carrying out my invention I provide a truck comprising a main frame mounted on wheels and supporting a frame adapted to carry the shocks. The shock-supporting frame comprises side bars, and a front cross-bar to which are secured rearwardly extending rods adapted to pass under a shock and to carry it. The shock-supporting frame is provided with a vertically arranged bail which is suspended from an arched frame rising from the truck frame by block-and-tackle, the rope of which is connected with a windlass on the truck frame and by means of which the shock-supporting frame may be raised and lowered. Guides are provided for the front end of the shock-supporting frame and the truck is provided with means for hitching a draft animal at either the front or rear end. Devices are also provided for sustaining the shock-supporting rods, but which are applied after they have been drawn under the shock.

In the accompanying drawings, Figure 1 is a perspective view of the shock truck constructed in accordance with my invention. Fig. 2 shows a longitudinal central section of the truck with the shock-supporting frame lowered and in position to pass under a shock. Fig. 3 is a similar view showing a shock arranged on the supporting frame and with this frame elevated, the truck being then ready to proceed from the field.

The truck frame comprises side bars A connected at the front by a cross-bar B and supported by wheels C. The cross-bar B is provided with an extension D to which are secured straps E to the front end of which the whiffletree F is pivoted and which also supports the pilot wheel G. To the side bars A are secured the two members H, H' of a vertically arranged arched frame. These members H, H' are secured together at their upper ends and support a pulley block I and the members H, H' are strengthened or stayed by braces $h$ attached to their lower ends and also attached to the side bars A, A', as shown.

The shock-supporting frame J comprises side bars $j$, a cross-bar $j'$ at the front, and a cross-bar $j^2$ at the rear. The front cross-bar is permanently connected with the side bars, but the rear cross-bar is detachably connected therewith by removable pins $j^3$.

$J^2$ indicate rods attached to the front bar $j'$ and extending rearwardly therefrom.

K indicates draft chains to which the draft animal is attached when it is desired to move the truck back to draw the rods $J^2$ under the shock.

A bail L is attached to the shock-supporting frame at its lower ends and at its upper middle portion is connected with a pulley block M through which extends the rope N that also passes through the pulley block I. Braces O strengthen the connection between the lower ends of the bail and the shock-supporting frame. By operating the rope N the shock-supporting frame may be raised and lowered.

In order to guide the front end of the shock-supporting frame, I provide guides P consisting of vertically arranged flanged bars $p$ extending downwardly from the front ends of the side bars and having rearwardly extending braces $p'$, the rear ends of which are attached to the inner sides of the side bars A. These guides coöperate with guide members Q secured to the front ends of the shock-supporting frame and extending vertically between the front faces of the guides P and the front cross-piece B or spacing blocks $b$ thereon.

The guide members Q have diagonally arranged portions $q$ which are attached to the side bars $j$. In this way the shock-supporting frame is prevented from tilting while being raised and lowered.

The windlass R for operating the rope N may be of any suitable construction. Its shaft is mounted in bearings $r$ secured to the cross-bar B and its shaft $r'$ is provided with an operating handle R'. The shaft $r'$ carries a ratchet wheel $R^2$ with which engages a dog $R^3$ preventing a reverse movement of the windlass when the rope is being wound up thereon. The dog R³ may be detached from the ratchet wheel and thrown back when it is desired to lower the shock-supporting frame.

S indicates a rod which is used to support the rear ends of the rods J² when they are sustaining a shock. This rod may be supported by chains T attached to the side bars j in the manner shown in Fig. 1. The rear cross-bar j² when not in use may be supported in the devices U on one of the side bars A.

The truck may be carried to and from the field by a draft animal attached to the whiffletree F. When it is desired to load the truck with a shock the former is backed up to the shock and the shock-supporting frame J is lowered in the manner indicated in Fig. 2, the side bars j being on opposite sides of the shock, then the draft animal is hitched to the chains K and the rods J² are made to pass beneath the shock. When this is done the rod S is passed beneath the rods J² and made to engage the chains T, as shown in Fig. 3, then the windlass is operated to elevate the shock-supporting frame the desired distance from the ground, as indicated in Fig. 3. The dog R³ will prevent a reverse movement of the windlass and the shock-supporting frame will be held in an elevated position. The draft animal now being hitched to the whiffletree the truck may be driven to the plowed ground, deliver its shock and return for another one.

The shocks are ordinarily delivered by the shock-forming machine on the stubble field or unplowed ground and while the shocks are standing the ground is plowed between the rows of shocks, and my shock truck is preferably made to deliver the shocks on the ground thus plowed so that the ground where the shocks formerly stood may be plowed.

By this invention shocks made up of, say twenty-five sheaves, may be easily loaded onto the truck and quickly conveyed to their destination.

I claim as my invention:

1. A shock truck, comprising a main frame supported on wheels, a shock-supporting frame mounted therein and provided with a vertically arranged bail, an arched frame rising from the main frame of the truck, a windlass carried by the truck frame, and block-and-tackle connections supported by the arched frame connected with the bail and operated by the windlass.

2. A shock truck, comprising a main frame supported on wheels, a shock-supporting frame, comprising side bars and a series of parallel rods between the side bars, a transversely arranged rod for supporting the rear ends of said parallel rods, means for suspending the shock-supporting frame from the truck frame, and means for elevating the shock-supporting frame.

3. A shock truck, comprising a main frame supported by wheels, a shock-supporting frame, comprising parallel side bars, a front cross-bar and a detachable rear cross-bar, devices at the front and rear of the truck for hitching a draft animal, parallel rods secured to the front cross-bar and extending rearwardly therefrom, a transversely arranged rod for supporting the rear ends of said parallel rod, means for suspending the shock-supporting frame in the main frame of the truck, and means for elevating and lowering said shock-supporting frame.

4. A shock truck, comprising a main frame supported by wheels; a shock-supporting frame, comprising parallel side bars, a front cross-bar and a detachable rear cross-bar, guide members attached to the front cross-bar of the main frame and the front portion of the shock-supporting frame for maintaining the level of the shock-supporting frame, an arched frame attached to the main frame from which the shock-supporting frame is suspended, and means for raising and lowering the shock-supporting frame.

In testimony whereof, I have hereunto subscribed my name.

GEORGE MARSHALL.

Witnesses:
S. S. SIDNER,
JESSIE MILLER.